(12) United States Patent
Stavely et al.

(10) Patent No.: US 7,289,151 B2
(45) Date of Patent: Oct. 30, 2007

(54) SYSTEM AND METHOD FOR DATA CAPTURE

(75) Inventors: Donald J. Stavely, Windsor, CO (US); James H. Anderson, Fort Collins, CO (US); Gregory V. Hofer, Loveland, CO (US); Scott A. Woods, Bellvue, CO (US); James S. Voss, Clovis, CA (US)

(73) Assignee: Hewlett-Packard Develoment Company, L.P., Houston, TX (US)

( * ) Notice: Subject to any disclaimer, the term of this patent is extended or adjusted under 35 U.S.C. 154(b) by 736 days.

(21) Appl. No.: 10/882,826

(22) Filed: Jul. 1, 2004

(65) Prior Publication Data

US 2006/0001764 A1 Jan. 5, 2006

(51) Int. Cl.
*G02B 13/00* (2006.01)
(52) U.S. Cl. ..................................... 348/354
(58) Field of Classification Search ............... 348/349, 348/351, 353, 354, 356
See application file for complete search history.

(56) References Cited

U.S. PATENT DOCUMENTS 5,751,354 A * 5/1998 Suzuki et al. ............... 348/349
2003/0063212 A1* 4/2003 Watanabe et al. ........... 348/349

\* cited by examiner

*Primary Examiner*—Lin Ye
*Assistant Examiner*—Dillon Durnford-Geszvain

(57) ABSTRACT

In one embodiment there is shown a method for capturing data, the method comprising sensing a first signal, capturing an auto exposure (AE) image in response to a sensed first signal, the auto exposure image captured with settings based upon preestablished criterion, and upon the AE image being captured, determining if a second signal has been sensed, and if the second signal has been sensed, capturing a speculative full exposure image, and if the captured speculative full exposure is determined to be acceptable, reading the remainder of the captured speculative image.

9 Claims, 2 Drawing Sheets

SYSTEM AND METHOD FOR DATA CAPTURE

FIELD OF THE INVENTION

This invention relates to establishing electronic data capture and more particularly to a system and method for image capture with respect to an electronic capture device.

DESCRIPTION OF RELATED ART

It has become common practice with respect to image capturing devices to first focus the target image and then, when the focus is acceptable to the viewer, (either by looking through the main lens or through an auto-focus lens) capture the picture. In some systems, an auto focus system is employed to aid the user. Auto-focus systems typically begin with an out-of-focus image and the lens is adjusted by software control until the image is deemed "in-focus".

With digital cameras, focusing is performed automatically when the user pushes the camera's shutter control button. This button (as it is starting its operational trajectory) passes through a stage called the S1 stage. In the S1 stage, the camera, or other imaging device, begins to generate a test sequence of images, some or all of which are at different focus positions with respect to each other. The system then uses auto-focusing software to determine which one of the precaptured images is the "best" image, i.e. which image is the sharpest. In many situations, this focusing process takes between half second and one second, thus preventing the rapid capture of a fleeting event, or of a series of pictures.

BRIEF SUMMARY OF THE INVENTION

In one embodiment there is shown a method for capturing data, the method comprising sensing a first signal, capturing an auto exposure (AE) image in response to a sensed first signal, the auto exposure image captured with settings based upon preestablished criterion, and upon the AE image being captured, determining if a second signal has been sensed, and if the second signal has been sensed, capturing a speculative full exposure image, and if the captured speculative full exposure is determined to be acceptable, reading the remainder of the captured speculative image.

In another embodiment there is shown a digital camera comprising; a shutter control, an adjustable focus lens, an image sensor for electronically capturing images based upon the focus position of the lens, a single image analysis routine for determining whether or not a captured image has acceptable focal quality, a multi-image analysis routine for determining the best focal quality from a series of images, and a selector for accepting an image based upon the single image routine when the focal quality of the image is acceptable and for accepting an image based upon the multi-imaging routine when the focal quality based upon the single image metric is not acceptable.

DETAILED DESCRIPTION

Figure 1:
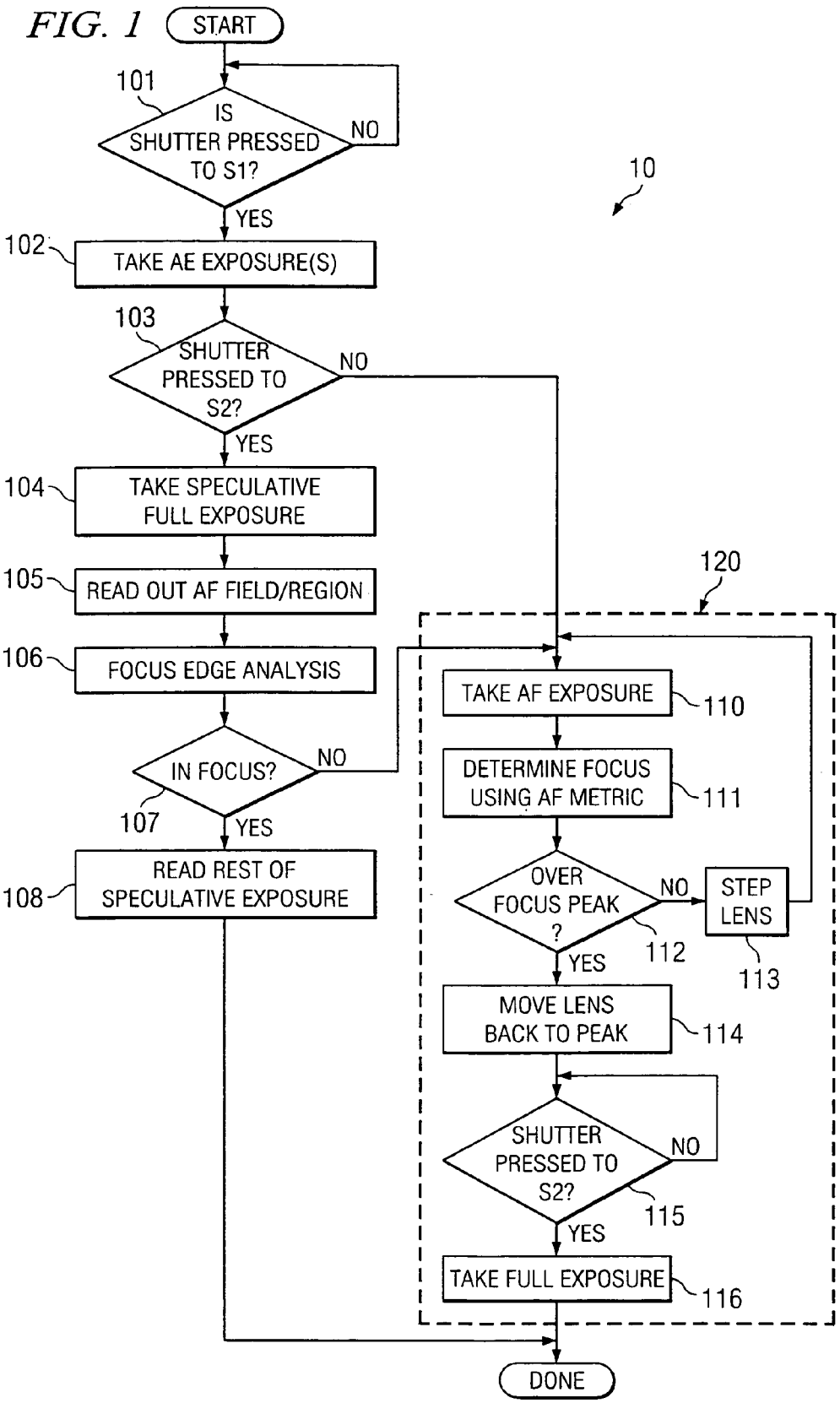
FIG. 1 shows a flow chart of one embodiment of a process for controlling image capturing.

Turning now to FIG. 1, there is shown flow chart 10 of one embodiment of a process for controlling image capturing. Some digital devices, such as digital camera 30, (FIG. 3) have two-position in-line shutter button 31. The two positions are called the S1 and S2 positions. The first or S1 position is entered when the shutter button is pushed approximately half-way down. The second or S2 position is entered when the shutter button is pushed beyond the half-way point and usually to its fully stopped position.

The S1 position allows the camera to focus and, if desired, to adjust for proper light exposure. The user, when satisfied that the target image is properly framed and/or focused, then pushes the shutter button to the S2 position to capture and store the desired image.

In process 101, FIG. 1, the system determines if the shutter button has reached the S1 (first) position. When the shutter button reaches the S1 position, the image capture device, under control of process 102, captures an auto exposure (AE) image. This AE image is taken either at the same focus position as was the most recent prior picture or at the hyperfocal length. For this discussion, the hyperfocal length is defined as a position somewhere between infinity and full close up. The AE image is typically every $5^{th}$ or $7^{th}$ row and is thus smaller and takes less time to read than it does to read a full field. On a typically 3-field interfaced CCD, each field contains every third row of exposure data and the fields must be read out one at a time. With CMOS sensors, the read out is randomly addressable and thus quicker to access. The AE resolution is sufficient for setting the exposure for subsequent AF or full exposures, but may not be of sufficient resolution for good focus measurement.

The capture device should perform one or more AE exposures to know what apertures and exposure times will be needed for any later exposures, including the auto focus (AF) exposures. Short exposures will be "down in the noise", while long exposures will saturate the sensor, yielding "blown out" data. The camera typically needs to operate over 20 stops of scene brightness, which is $2^{20th}$, which is 1,000,000 to 1.

So, AE is required before either (the speculative exposure) or the AF exposures. In this context, the speculative exposure is one field of the 3-field CCD. The invention describes taking the speculative exposure if the user has pressed from S1 to S2 by the time the AE exposure(s) are done, and before the normal AF exposures have started.

Process 103 determines whether or not the shutter has been pressed to the S2 position. One reason for the S2 position not being sensed is because the user has paused at the S1 position. If S2 has not been sensed, then the system takes the AF exposure under control of process 110. An AF exposure must have decent resolution for calculating a focus metric, but only for a center autofocus zone of the CCD or CMOS sensors. Since a CCD must clock out all its rows sequentially (whereas a CMOS sensor can be randomly read), a CCD camera exposes the CCD array and then begins the readout of the first field. The electronics quickly shifts and throws away the unneeded rows above and below the AF zone, but clocks out the rows containing the AF zone. So, AF uses one CCD field and uses special clocking to obtain just the AF zone read out, as quickly as possible.

Figure 2:
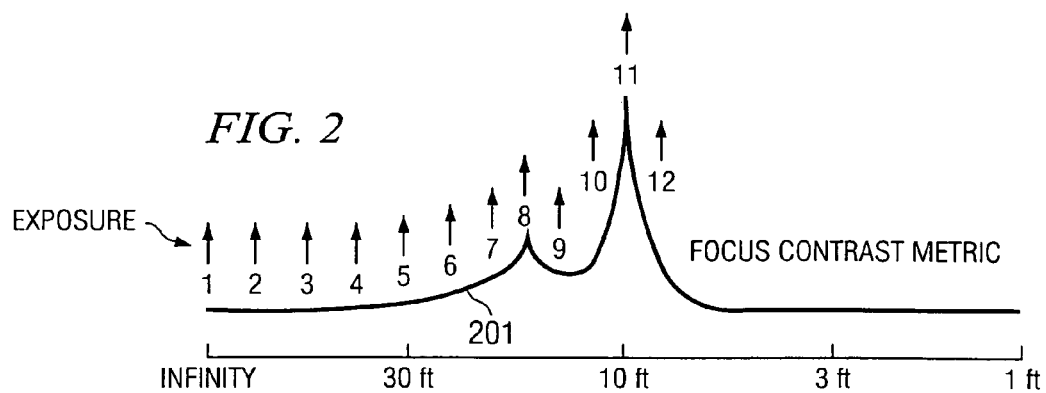
FIG. 2 shows an image chart of a multi-image auto-focusing system.

Process 111 uses a focus metric to determine if the autofocus exposure is sufficient. One system and method for achieving auto-focus using the S1 position is shown in FIG. 2 where a series of images 1-12 are captured at different focus positions, starting, as shown, at infinity or at the hyperfocal point. The focus contrast metric is used to compare adjacent images against each other. So long as the metric is going up, as shown by line 201, the next highest valued image is used. When the image value starts down, as shown with image 12, the system determines that image 11 is the "best" in terms of focus. Note that false peaks, such as shown at image 8, are taken into consideration, in a typical auto-focus process. These processes are now well-known, and can include, by way of example, creating a moving threshold underneath the focus metric curve. The metric must cross below the threshold to determine that the peak has been passed.

Process 112 (FIG. 1) determines whether the focus has peaked (as discussed above). If it has not peaked, then the lens is stepped (or otherwise refocused) under control of process 113 and new AF exposures are taken until processes 111 and 112 determine acceptability. Process 114 then returns the lens to the position of best focus.

Process 115 waits for the shutter control to reach the S2 position. When the S2 position is reached, a full exposure is taken under control of process 116. The AF process determines the settings that will capture the "best" image and it is these settings that are used for the full image capture.

Branch 120 of the flow chart shows the processes in a traditional image capture device where there is a relatively long period of time between the detection of the S1 shutter position and the S2 shutter position.

Returning to Process 103, if the S2 shutter position is reached relatively quickly after the S1 shutter position is sensed, then process 104 controls the taking of a speculative full exposure.

Process 105 reads out the AF field/region of the speculative exposure. Process 106 performs an analysis of focus, for example, using an edge analysis to determine if the image is in focus. The speculative exposure analysis is absolute, for example; by looking for any occurrence of edges. This is in contrast to the AF analysis (process 111) which is a relative process looking for the maximum of a contrast metric between a series of AF images, as discussed above. Process 107 determines if the image is in focus. If it is, the rest of the speculative exposure, the other fields (fields 2 and 3 in a 3 field system) are read out via process 108 and the image is captured. If, in process 107, the focus is not acceptable, then branch 120 of flow chart 10 is followed as discussed above.

Figure 3:
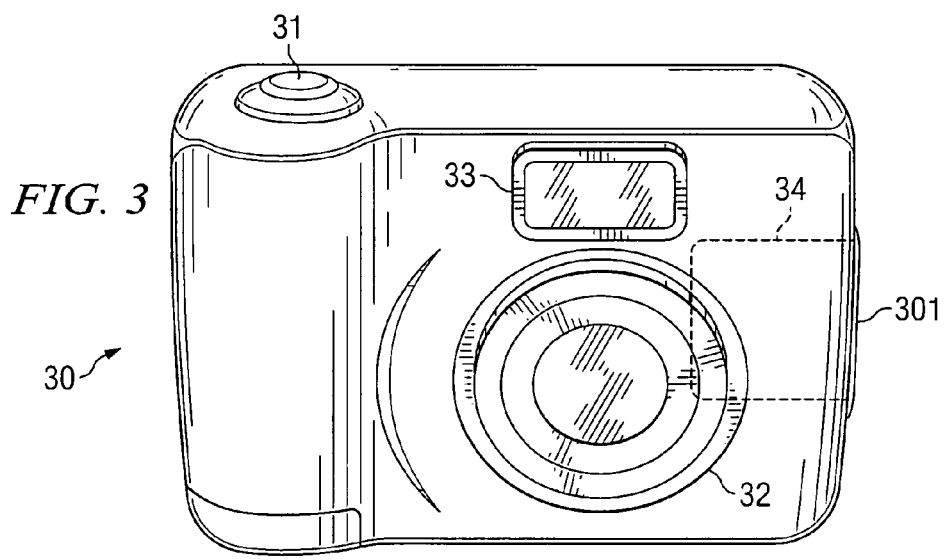
FIGS. 3 and 4 show an embodiment of an electronic image capturing device using the control process shown in FIG. 1.

FIG. 3 shows the front view of one embodiment of image capture device 30. In this situation, the device is a digital camera having shutter control button 31, lens 32, alternate viewer 33, and memory card 34 inserted in slot 301. The image capture device could be a video camera, a PDA, cell phone or any device that determines good data (image data or otherwise) from poorer data. While the systems and methods discussed herein are presented with respect to image capturing, the same concepts can be used for the capture of other types of data where both fast and slower data capture modes are preset.

Figure 4:
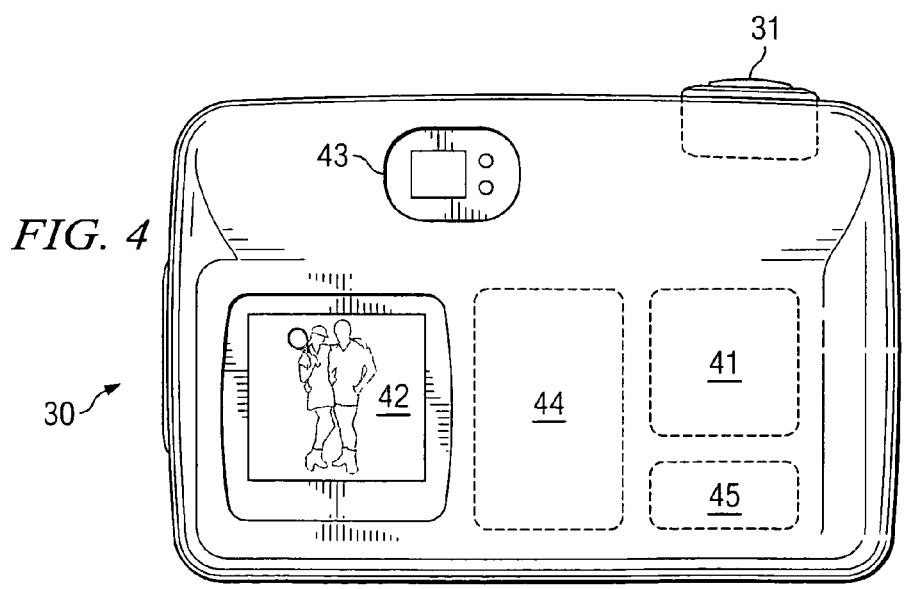

FIG. 4 shows the back view of camera 30 having display 42 for showing captured (or about to be captured) images to the user. Inside the camera there is at least one sensor 44 that can be a CCD or other type of sensor for capturing the image. There is also shown the back portion 43 of the auxiliary window, as well as processor 41 and memory 45. Memory 45 could, if desired, be separate from memory card 34, and processor 41 could be used, if desired, to run the processes discussed above with respect to FIG. 1, as well as many other image control processes. Power for camera 30, such as a battery, is not shown.

What is claimed is:

1. A method for capturing data; said method comprising:
   sensing a first signal;
   capturing an auto exposure (AE) image in response to a sensed first signal, said AE image captured with settings based upon preestablished criterion;
   upon said AE image being captured, determining if a second signal has been sensed;
   if said captured speculative full exposure image is determined to be acceptable, reading the remainder of said captured speculative image, wherein said determination of acceptability of said captured full exposure speculative image is an absolute focus analysis.

2. The method of claim 1 further comprising:
   if said second sensed signal has not been sensed upon said AE image being captured, capturing an autofocus (AF) image;
   performing a relative focus analysis among a series of captured AF images to select the best settings for an image; and
   upon detection of a sensed second signal, taking a full exposure using said best settings.

3. The method of claim 1 wherein said data is captured in a digital camera.

4. The method of claim 3 wherein said speculative full exposure image is captured at said digital camera's hyperfocal position.

5. The method of claim 3 wherein said first signal and said second signal are sensed from a push of said camera's shutter control.

6. The method of claim 5 wherein said shutter control has sequentially enabled positions and wherein said second signal occurs when said shutter control reaches a second position.

7. The method of claim 1 wherein said data is electronic image data.

8. The method of claim 1 wherein said AE image is captured at the focal position of a last captured image.

9. The method of claim 1 wherein said captured speculative full exposure image is determined to be unacceptable, capturing an autofocus (AF) image; and performing a relative focus analysis among a series of captured AF images to select the best settings for an image; and using said best settings to capture a full image.

* * * * *

UNITED STATES PATENT AND TRADEMARK OFFICE
CERTIFICATE OF CORRECTION

PATENT NO. : 7,289,151 B2  Page 1 of 1
APPLICATION NO. : 10/882826
DATED : October 30, 2007
INVENTOR(S) : Donald J. Stavely et al.

It is certified that error appears in the above-identified patent and that said Letters Patent is hereby corrected as shown below:

On the title page, item (73), under "Assignee", in column 1, line 1, delete "Develoment" and insert -- Development --, therefor.

Signed and Sealed this

Seventeenth Day of June, 2008

JON W. DUDAS
*Director of the United States Patent and Trademark Office*